United States Patent Office 2,779,784
Patented Jan. 29, 1957

2,779,784
BASIC ALKALINE EARTH METAL SULFONATES AND METHOD OF MAKING SAME

Marion L. Sharrah, Ponca City, Okla., assignor to Continental Oil Company, Ponca City, Okla., a corporation of Delaware No Drawing. Application May 13, 1954,
Serial No. 429,685

9 Claims. (Cl. 260—505)

This invention relates to stable, oil-dispersible, highly basic, metal-containing inorganic compositions and methods of making the same. Such compositions possessing increased detergency and increased reserve basicity find especial utility as additives in lubricating oils and likewise are useful for producing corrosion inhibiting compositions and similar purposes.

It is believed that in heavy duty detergent type lubricating oil compositions for use in diesel and like internal combustion engines, at least two requirements must be met by such oils (in addition to lubricity, stability, and the like) if a high degree of engine cleanliness is to be maintained. First, the oil must possess the power to disperse insolubles formed by fuel combustion or oil oxidation, or both; and second, the oil must be capable of neutralizing acidic lacquer precursors formed by either oil oxidation or interaction of the oil with sulfur acids produced from fuel combustion, or both of these conditions. The detergents generally employed in oils for engine operation with high sulfur fuel (e. g., conventional metal sulfonates or phenates) are only mildly alkaline and their basicity is rapidly depleted during engine operation.

It has been proposed heretofore to incorporate by various methods detergents such as calcium petroleum sulfonate in lubricating oil designed for use in internal combustion engines. In one procedure, oil-soluble sodium sulfonate derived as a by-product in the manufacture of mineral white oil was converted to calcium sulfonate by treatment with reactive calcium compounds, and the resulting calcium sulfonate was then admixed with lubricating oil. In another procedure oil-soluble sulfonic acids were isolated, added to the lubricating oil, and thereafter neutralized with a basic calcium compound to produce calcium sulfonate in the oil. In still another procedure the hydrocarbon stock was sulfonated, sludge removed, and then the resulting solution of sulfonic acids was neutralized with an aqueous suspension of lime.

Griesinger, et al., in U. S. Patent, 2,402,325, describe a process for producing a calcium sulfonate which possesses a reserve alkalinity for use as a detergent in lubricating oils. In brief, an excess, generally about 180 to 220 percent of that required for complete neutralization of lime is added to the sulfonic acids. The powdered lime is thoroughly dispersed in the oil with vigorous agitation and the resulting mixture is heated with open steam to a temperature of about 220 to 230° F. Finally, after about one to two hours and the removal of water by blowing with air, the resulting mixture is filtered to remove solid materials from the oil. The resulting mixture may contain from 15 to 40 percent by weight of the basic calcium sulfonate and it has an alkaline reaction. As an example, such a mixture containing 30 percent by weight of the basic calcium sulfonate exhibits an alkalinity equivalent of 5.5 to 6.5 mg. KOH per gram.

It is accordingly a principal object of this invention to provide metal-containing, stable dispersions of inorganic compounds in mineral oil and process for the production of such dispersions.

It is another object of my invention to provide highly useful mineral oil compositions utilizing such dispersions.

Other objects of the invention will appear as the description proceeds.

To the accomplishment of the foregoing and related ends, this invention then comprises the features hereinafter fully described and particularly pointed out in the claims, the following description setting forth in detail certain illustrative embodiments of the invention, these being indicative however, of but a few of the various ways in which the principle of the invention may be employed.

Broadly stated, the present invention may be described as a process for producing a stable, oil-dispersible, highly basic alkaline earth metal alkylaryl sulfonate by heating a mixture comprising an oil-soluble alkaryl sulfonic acid, an alkaline earth metal compound in excess of that required for the complete neutralization of the sulfonic acid and water under superatmospheric pressure. At the end of the reaction and after the water is removed by azeotropic distillation the product is filtered. Finally any solvents used may be removed by evaporation to give a product which has a high alkaline reserve.

While I do not wish to be bound by any theory of how or why my results are produced, I believe that the correct explanation of these results is substantially as follows: When an organic sulfonic acid and an alkaline earth metal compound in excess of that required to neutralize the sulfonic acid are agitated together in the presence of an appreciable amount of water at temperatures above 220° F., and under sufficient pressure to hold the water in the liquid state, the water provides a condition whereby the excess alkaline earth metal compound forms a stable dispersion. If the reaction is carried out in an open kettle, the water escapes before the reactants reach the temperature at which dispersion of the alkaline earth metal compound is most suitably obtained.

Before proceeding with specific examples, it may be well to indicate in general the nature of the materials required in the process.

SULFONIC ACIDS

Sulfonic acids which are oil soluble may be used in the process of my invention. Typical are those obtained by the sulfonation of aromatic and alkyl aromatic hydrocarbons such as cuts obtained by fractionation of petroleum by distillation and/or extraction or by the alkylation of aromatic hydrocarbons as for example those obtained by alkylating benzene, toluene, xylene, cumene, naphthalene, alkylnaphthalene, diphenyl, alkyldiphenyl, and their halogen derivatives such as chlorobenzene, chlorotoluene and chloronaphthalene. The alkylation may be made under the influence of a catalyst with alkylating agents having from about 3 to more than 30 carbon atoms such as for example haloparaffins, olefins that may be obtained by dehydrohalogenation of haloparaffins or by dehydrogenation of paraffins, polyolefins such as for example polymers from ethylene, propylene, butylene, ethylene and propylene, alkylsulfate, aliphatic alcohols and others. Preferred sulfonic acids are those obtained by sulfonation of hydrocarbons prepared by the alkylation of benzene or toluene with tri-, tetra-, or penta-propylene fractions obtained by the polymerization of propylene. Other preferred sulfonic acids are those obtained by sulfonation of hydrocarbons prepared by the alkylation of benzene or toluene with one or more equivalents of halogenated petroleum wax having from about 18 to more than 30 carbon atoms.

ALKALINE EARTH METAL COMPOUNDS

The alkaline earth metal compounds that may be used to neutralize the sulfonates include the oxides and hydroxides (including hydrates), alcoholates, carbonates, carboxylate, sulfide, hydrosulfide, nitrate, thiocarbonate, borates and others of magnesium, calcium, strontium and barium. Examples are calcium oxide, calcium hydroxide, calcium carbonate, magnesium acetate, strontium benzoate, barium lactate, barium hydrosulfide, strontium nitrate, and magnesium borate.

The alkaline earth metal compound must be used in excess of that required for the complete neutralization of the sulfonic acids. Generally the amount used ranges from 110 to 220 percent; however, I prefer to employ at least about 120 percent of the amount required for complete neutralization. From a practical standpoint there is no need to use much more than 200 percent of the inorganic compound as the excess over that which reacts and forms a stable dispersion is removed during the filtration step.

As stated before, it is essential to have water present during the reaction of the alkaline earth metal compound with oil-soluble sulfonic acids. The exact amount of water used is not critical. I have found that amounts varying from about one-half to about ten times the amount of the alkaline earth metal compound present may be used.

Suitable and preferred temperature ranges vary from about 220 to 390° F., and 250 to 350° F., respectively. Obviously, the pressure will vary according to the temperature, volume of the reactor, and quantity and identity of the materials charged into the reactor. Depending upon these factors, the pressure may vary from about 2 to 10 atmospheres. If a volatile solvent is used the pressure may be even higher.

THE SOLVENTS

While the use of a solvent is not essential, I prefer to use a solvent for convenience as the reaction proceeds more efficiently and the resulting product is more fluid and consequently easier to work. Suitable solvents include, aliphatic hydrocarbons, 170 pale oil (SSU at 100° F.), aromatic hydrocarbons such as benzene and toluene. In addition other solvents such as aliphatic, olefinic, cycloalphatic, and cyclo-olefinic hydrocarbons containing less than 10 carbon atoms may be used.

In order to disclose the nature of the present invention still more clearly, the following illustrative examples will be given. It is to be understood, however, that the invention is not to be limited to the specific conditions or details set forth in these examples except insofar as such limitations are specified in the appended claims. Parts given are parts by weight.

All the base numbers of the products of this invention were determined by the acetic acid titration method which utilizes glacial acetic acid as the solvent and a solution of perchloric acid in glacial acetic acid as the titrant. The method is especially adapted for deteriminations of this type since equilibria are obtained rapidly. The procedures for carrying out acetic acid titrations are generally outlined in Analytical Chemistry, vol. 23, No. 2, February 1951, page 337, and vol. 24, No. 3, March 1952, page 519.

Example 1

A mixture consisting of 200 parts of hexane, 50 parts of 170 pale oil (SSU 100° F.), and 150 parts of sulfonic acid (0.1368 meq. of acid per gram) obtained by the sulfonation of diwax benzene was added to a reaction vessel. Two parts of isopropanol and 23.1 parts of barium oxide in 50 parts of water were then added to the reactor. The mixture was heated with agitation at atmospheric pressure for a period of two hours after which the water was removed by distillation. The reaction mass was filtered and then heated to 170° C. to remove the solvents. The resulting product had a base number of 14.8.

Example 2

A mixture consisting of 200 parts of hexane, 50 parts of 170 pale oil (SSU 100° F.), and 150 parts of sulfonic acid (0.1368 meq. of acid per gram) obtained by the sulfonation of diwax benzene was added to a reaction vessel. Two parts of isopropanol and 23.1 parts of barium oxide in 50 parts of water were then added to the reactor. The solvent were then removed by distillation and the water was returned to the reactor. The reactor was then closed and the contents contained therein were heated with agitation to 120° C. for two hours, which developed a pressure of 79 pounds p. s. i. g. The mixture was diluted with hexane filtered through clay and then heated to 170° C. to remove the hexane. The resulting product had a base number of 30.9.

Example 3

A mixture of consisting of 200 parts of hexane, 50 parts of 170 pale oil (SSU 100° F.), and 150 parts of sulfonic acid (0.1368 meq. of acid per gram) obtained by the sulfonation of diwax benzene was added to a reaction vessel. Two parts of isopropanol and 11.1 parts of calcium hydroxide in 50 parts of water were then added to the reactor. The mixture was heated with agitation at atmospheric pressure for a period of two hours after which the water was removed by distillation. The reaction mass was filtered and then heated to 170° C., to remove the solvents. The resulting product had a base number of 2.3.

Example 4

A mixture consisting of 200 parts of hexane, 50 parts of 170 pale oil (SSU 100° F.), and 150 parts of sulfonic acid (0.1368 meq. of acid per gram) obtained by the sulfonation of diwax benzene was added to a reaction vessel. Two parts of isopropanol and 11.1 parts of calcium hydroxide in 50 parts of water were then added to the reactor. The solvents were removed by distillation and the water was returned to the reactor. The reactor was then closed and the contents contained therein were heated with agitation to 120° C. for two hours, which developed a pressure of 79 pounds p. s. i. g. The mixture was diluted with hexane filtered through clay and then heated to 170° C. to remove the hexane. The resulting product had a base number of 4.8.

Lubricating compositions were prepared by adding the product of Example 1 in varying proportions to several blends of S. A. E. 30 mineral oil containing a small amount of added sulfur as a phosphorous pentasulfide treated wax olefin. Additional lubricating compositions were prepared in a similar manner using the products of Examples 2, 3, and 4. The lubricating composition containing the product of Example 2 exhibited the best overall performance in a gasoline engine test.

In addition to their use in lubricating oil compositions, the highly-basic product of this invention may be used in a variety of applications where alkalinity is desirable for control of corrosion. Such applications include oil well inhibitors where the highly-basic material serves in a dual role of increasing the specific gravity as well as providing alkalinity for corrosion control. They may be used as corrosion inhibtors for antifreeze formulations, in storage rustproofing compositions for aircraft engines, and in the slushing compounds commonly used for protection of stored metal parts and equipment against corrosion.

When used with lubricating oils they may be present in amounts ranging from about 2 to 10 percent by weight of the lubricating composition; however, it should be understood that larger or smaller amounts may be used as desired between the ranges of about 1 to 25 percent. The amount depending in part upon the base number and the particular application to which the finished composition is to be put.

When used in lubricating blends the oil portion is preferably of the so-called mineral or hydrocarbon oils, but may also consist of wholly or contain in part certain fatty oils including corn oil, soybean oil, lard oil, or the like. The blends may likewise contain voltolized oils or synthetic oils of lubricating viscosity. Mineral oil is meant to include oils refined from any of the various crude oils by any of the usual refining processes including distillation, solvent extraction, acid treatment, clay treatment, diwaxing, and the like. When used in lubricating oil compositions it will be understood that small amounts of other materials all of which are conventional in this field may be added as necessary and desired. These include antifoaming agents, pourpoint depressants, materials to improve the oiliness of the composition, and the like.

It is apparent that many modifications and variations of the invention as hereinbefore set forth may be made without departing from the spirit and scope thereof. As for example, while a small amount of isopropanol was used in the examples, other alcohols may be substituted or the alcohol may be eliminated. It is used merely as a matter of convenience. Obviously solids may be removed by centrifuging as well as by filtering. The examples given are by way of illustration only and the invention is limited only by the terms of the appended claims.

I claim:

1. A process for the preparation of a highly basic alkaline earth metal alkylaryl sulfonate which comprises heating a mixture comprising an oil-soluble sulfonic acid, an alkaline earth metal compound, and water in the temperature range of from about 220 to about 390° F., and at superatmospheric pressures wherein the amount of said alkaline earth metal compound is in excess of that required for neutralization of said sulfonic acid and the water being present in the proportion of 5 to 100 parts per 10 parts of said alkaline earth metal compound and subsequently removing the water therefrom.

2. A process for the preparation of a highly basic alkaline earth metal alkylaryl sulfonate which comprises heating a mixture comprising an oil-soluble sulfonic acid, and alkaline earth metal compound, and water in the temperature range of from about 250 to about 350° F., and at superatmospheric pressures wherein the amount of said alkaline earth metal compound is in excess of that required for neutralization of said sulfonic acid and the water being present in the proportion of 5 to 100 parts per 10 parts of said alkaline earth metal compound and subsequently removing the water therefrom.

3. A process for the preparation of a highly basic alkaline earth metal alkylaryl sulfonate which comprises heating a mixture comprising an oil-soluble sulfonic acid, an alkaline earth metal compound, and water in the temperature range from about 220 to about 390° F., and at superatmospheric pressures wherein the amount of said alkaline earth metal compound used varies from 110 to 220 percent of that which will react stoichiometrically with said sulfonic acid and the water being present in the proportion of 5 to 100 parts per 10 parts of said alkaline earth metal compound and subsequently removing the water therefrom.

4. A process for the preparation of a highly basic alkaline earth metal alkylaryl sulfonate which comprises heating a mixture comprising an oil-soluble sulfonic acid, an alkaline earth metal compound, and water in the temperature range from about 220 to about 390° F., and at superatmospheric pressures wherein the amount of said alkaline earth metal compound used varies from 120 to 200 percent of that which will react stoichiometrically with said sulfonic acid and the water being present in the proportion of 5 to 100 parts per 10 parts of said alkaline earth metal compound and subsequently removing the water therefrom.

5. A process for the preparation of a highly basic alkaline earth metal alkylaryl sulfonate which comprises heating a mixture comprising an oil-soluble sulfonic acid, an alkaline earth metal compound, and water in the temperature range from about 250 to about 350° F., and at superatmospheric pressures wherein the amount of said alkaline earth metal compound used varies from 110 to 220 percent of that which will react stoichiometrically with said sulfonic acid and the water being present in the proportion of 5 to 100 parts per 10 parts of said alkaline earth metal compound and subsequently removing the water therefrom.

6. A process for the preparation of a highly basic alkaline earth metal alkylaryl sulfonate which comprises heating a mixture comprising an oil-soluble sulfonic acid, an alkaline earth metal compound, and water in the temperature range from about 250 to about 350° F., and at superatmospheric pressures wherein the amount of said alkaline earth metal compound used varies from 120 to 200 percent of that which will react stoichiometrically with said sulfonic acid and the water being present in the proportion of 5 to 100 parts per 10 parts of said alkaline earth metal compound and subsequently removing the water therefrom.

7. The process of claim 1 wherein the alkaline earth metal is barium.

8. The process of claim 1 wherein the alkaline earth metal is calcium.

9. The process of claim 1 wherein the oil-soluble sulfonic acid is diwax benzene sulfonic acid.

References Cited in the file of this patent

UNITED STATES PATENTS

| Number | Name | Date |
|---|---|---|
| 2,381,708 | Amott | Aug. 7, 1945 |
| 2,402,325 | Griesinger et al. | June 18, 1946 |
| 2,491,649 | Duncan et al. | Dec. 20, 1949 |
| 2,573,796 | Latier et al. | Nov. 6, 1951 |
| 2,610,946 | Eckert | Sept. 16, 1952 |
| 2,617,049 | Asseff et al. | Nov. 4, 1952 |
| 2,695,910 | Asseff et al. | Nov. 30, 1954 |